United States Patent [19]

Doft

[11] 4,154,698

[45] May 15, 1979

[54] RESOLUTION OF OIL-IN-WATER EMULSIONS CONTAINING URANIUM

[75] Inventor: Rodney H. Doft, Albuquerque, N. Mex.

[73] Assignee: Nalco Chemical Company, Oak Brook, Ill.

[21] Appl. No.: 804,695

[22] Filed: Jun. 8, 1977

[51] Int. Cl.$^2$ .......................... G21F 9/06; B01D 17/04
[52] U.S. Cl. ...................... 252/301.1 R; 252/301.1 W; 252/341; 252/344; 252/358; 423/8
[58] Field of Search ................ 252/301.1 R, 301.1 W, 252/341, 344, 358; 423/8, 9, 10

[56] References Cited

U.S. PATENT DOCUMENTS

| Re. 28,474 | 7/1974 | Anderson et al. ............... 260/26.9 B |
| 3,316,181 | 4/1967 | Sackis ................................... 252/341 |
| 3,341,305 | 9/1967 | Kreevoy et al. ......................... 423/9 |
| 3,969,476 | 7/1976 | Lucas et al. .............................. 423/9 |

Primary Examiner—Benjamin R. Padgett
Assistant Examiner—Deborah L. Kyle

Attorney, Agent, or Firm—John G. Premo; Robert A. Miller

[57] ABSTRACT

A method of resolving oil-in-water emulsions resulting from the organic solvent extraction of uranium from aqueous acidic leach liquors which comprises treating said emulsions in accordance with the following steps:

(a) adding to said emulsions a water-in-oil emulsion which contains from 2–50% by weight of a water-soluble acrylamide copolymer which contains from 5–50% by weight of a lower alkyl substituted tertiary aminoethyl methacrylate and quaternary ammonium salts thereof in an amount to provide at least 20 parts per million of the acrylamide copolymer;

(b) adjusting the pH of the emulsion being treated with ammonia to at least 9;

(c) adding to the ammonia treated emulsion a water-soluble surfactant which is capable of inverting the water-in-oil emulsion which contains the polymer; and then (d) slowly mixing the treated oil-in-water emulsion for at least one-half hour to obtain good resolution thereof.

2 Claims, No Drawings

RESOLUTION OF OIL-IN-WATER EMULSIONS CONTAINING URANIUM

INTRODUCTION

Uranium is normally recovered from uranium-bearing ores by first extracting the uranium with aqueous solutions of either acid or alkali. Sulfuric acid extraction is the most common. This extraction produces a leach liquor which is then further treated to remove and concentrate the uranium values. One method of extracting uranium from its leach liquor relies on the use of organic solvents which contain as the extractant or complexing agent organic phosphoric acids or fatty substituted amines, particularly fatty substituted tertiary amines. These extractants are usually dissolved in a light hydrocarbon liquid such as kerosene. In many instances, other organic liquids which act as cosolvents are used. After the uranium leach liquors are contacted with the solvents containing the organic extracting agent, the uranium is displaced to the organic phase which is treated with either water to precipitate the uranium or the solvent is evaporated.

For additional details with respect to the above described process, see the *Encyclopedia of Chemical Technology,* Second Edition, Vol. 21, Interscience, 1970.

These solvent extraction systems are continuously reused. This causes the formation of small amounts of extremely tight oil-in-water emulsions. These emulsions are removed from the system and heretofore have been disposed of by conventional means or stored. The amount of valuable organic component in the emulsions is substantial and is lost when the emulsions are discarded.

In an attempt to recover the organic portion of these emulsions, many conventional emulsion breaking agents have been tested with little or no success. If it were possible to resolve these emulsions whereby the organic phase could be recovered and returned to the uranium recovery process for reuse, an economy would be afforded. Similarly, if these emulsions can be resolved, then a less polluting byproduct could be afforded which could be disposed of more efficiently and with less harm to the environment.

In copending application, Ser. No. 801,894, filed May 31, 1977, now abandoned, for Emulsion Breaking, it has been shown that emulsions of the above type can be resolved by using certain acrylamide copolymers which contain 5-50% by weight of lower alkyl substituted tertiary aminoethyl methacrylates. While these copolymers are capable of resolving emulsions of the type described, they suffer from several disadvantages when used on a commercial scale. Their main disadvantage is that for optimum activity, the emulsion being treated should be elevated in temperature to about 100° C. This requires an additional energy input into such systems. Also, when the emulsion being treated contains molybdenum compounds, these compounds often remain in the oil phase of the resolved emulsion rather than being selectively extracted into the aqueous phase where the molybdenum values are more susceptible to recovery. This invention provides a distinct and worthwhile improvement over the teachings of the above described copending application.

THE INVENTION

In accordance with the invention, it has been found that water-in-oil emulsions resulting from the organic solvent extraction of uranium from aqueous leach liquors may be broken by treating these emulsions using the following steps:

(a) adding to said emulsions a water-in-oil emulsion which contains from 2-50% by weight of a water-soluble acrylamide copolymer which contains from 5-50% by weight of a lower alkyl substituted tertiary aminoethyl methacrylate and quaternary ammonium salts thereof in an amount to provide at least 20 parts per million of the acrylamide copolymer;

(b) adjusting the pH of the emulsion being treated with ammonia to at least 9;

(c) adding to the ammonia treated emulsion a water-soluble surfactant which is capable of inverting the water-in-oil emulsion which contains the polymer; and then (d) slowly mixing the treated oil-in-water emulsion for at least one-half hour to obtain good resolution thereof.

The Acrylamide Copolymers

The acrylamide copolymer used in the practice of the invention contains acrylamide which has been copolymerized with from 5-50% by weight and, preferably, 25-40% by weight of an amino methacrylate having the structural formula:

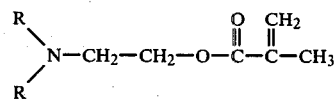

In the above formula, R is a lower aliphatic hydrocarbon radical which contains from 1-4 carbon atoms. A preferred comonomer is dimethylaminoethylmethacrylate (hereafter referred to as DMAEM). These monomers are described in U.S. Pat. No. 2,138,763. The molecular weight of these copolymers should be at least 50,000 and, preferably, greater than 500,000, and, in most cases, would be 1,000,000 or more.

These copolymers are used in the form of a water-in-oil emulsion which may be inverted in water in the presence of a surfactant to produce rapid solutions of the copolymer. These emulsions, when used in this invention, should contain 2-50% and, preferably, 20-35%, of the copolymer. This type of emulsion and its method of inversion is set forth in U.S. Pat. No. Re. 28,474. The method of preparing these copolymer emulsions is described in this patent as well as U.S. Pat. No. 3,284,393. The disclosures of these patents are set forth herein by incorporation.

A typical copolymer emulsion used in the practice of the invention contains approximately 40% by weight of water, 32% by weight of polymer, the balance being a paraffinic mineral oil such as ISOPAR M[1]. The particular copolymer would be composed of acrylamide and 11.5% DMAEM. This copolymer would be prepared in accordance with the preparative examples set forth in U.S. Pat. No. 3,284,393. It is hereinafter referred to as Copolymer A.

[1] See U.S. Pat. No. Re. 28,474.

The water-in-oil emulsions containing the acrylamide copolymers are added directly to the oil-in-water emulsions under conditions to insure that good admixture of the copolymers containing emulsion is obtained. Using rapid agitation, good admixture is achieved in periods of time ranging between 5 minutes and 1 hour. The amount of copolymer used based on total emulsion treated should be at least 20 parts per million and may be as much as 200-300 parts per million.

pH Adjustment

As indicated previously, these oil-in-water emulsions contain as a contaminant molybdenum compounds. For some unexplained reason, these molybdenum compounds interfere with the rapid breaking of the emulsion. They also should be separated from the organic portion of the emulsion in order to allow it to be recycled back into the main uranium recovery process stream. The molybdenum is readily removed from the organic phase of these emulsions by adjusting the pH of the emulsion which is normally acidic to about 9 or greater, e.g. 11.5-13, with ammonia or concentrated ammonium hydroxide solutions. For some unexplained reason, this enables better resolution of the emulsion to be achieved.

Ammonia should be added with good agitation and should be allowed to contact the emulsion for periods of time ranging between 5 minutes and 2 hours to insure complete reaction with any molybdenum compounds present.

The Water-Soluble Surfactant

As previously mentioned, the water-in-oil emulsions which contain the copolymers are readily inverted to produce a solution of the copolymer by adding them to water or an aqueous system which contains a water-soluble surfactant. An important part of the discovery upon which this invention is predicated resides in the fact that when small amounts of such a surfactant are added to the oil-in-water emulsion which contains uniformly admixed therethroughout the copolymer water-in-oil emulsion, not only is the polymer contained in the water-in-oil emulsion dissolved into the water to the oil-in-water emulsion, but the surfactant materially aids in the effectiveness of the copolymer as an emulsion breaker.

A preferred group of surfactants are the nonionic surfactants with a most preferred material being nonyl phenol which has been reacted with 6-12 moles of ethylene oxide. Other surfactants that may be used are any anionic, cationic, or nonionic compound. Examples of suitable anionic surfactants are alkali metal, ammonium and amine soaps, the fatty acid part of such soaps contains preferably at least 16 carbon atoms because soaps based on lauric and myristic acids have a great tendency to develop abundant foam.

Other examples of suitable anionic surfactants are alkali metal salts of alkyl-aryl sulfonic acids, sodium dialkyl sulfosuccinate, sulfated or sulfonated oils, e.g., sulfated castor oil, sulfonated tallow, and alkali salts of short chain petroleum sulfonic acids.

Other surfactants that may be used are condensation products of higher fatty alcohols with ethylene oxide, such as the reaction product of oleyl alcohol with 10 ethylene oxide units; condensation products of alkylphenols and ethylene oxide, such as the reaction products of isooctylphenol with 12 ethylene oxide units; condensation products of higher fatty acid amides with five, or more, ethylene oxide units; polyethylene glycol esters of long chain fatty acids, such as tetraethylene glycol monopalmitate, hexaethyleneglycol monolaurate, nonaethyleneglycol monostearate, nonaethyleneglycol dioleate, tridecaethyleneglycol monoarachidate, tricosaethylene glycol monobehenate, tricosaethyleneglycol dibehenate, polyhydric alcohol partial higher fatty acid esters such as sorbitan tristearate, ethylene oxide condensation products of polyhydric alcohol partial higher fatty esters, and their inner anhydrides (mannitolanhydride, called Mannitan, and sorbitolanhydride, called Sorbitan), pentaerythritolmonooleate reacted with 12 molecules of ethylene oxide, sorbitan monostearate reacted with 10 to 15 molecules of ethylene oxide; long chain polyglycols in which one hydroxyl group is esterified with a higher fatty acid and the other hydroxyl group is etherified with a low molecular alcohol, such as methoxypolyethylene glycol 550 monostearate (550 meaning the average molecular weight of the polyglycol ester). A combination of two or more of these surfactants may be used, e.g. a cationic may be blended with a nonionic or an anionic with a nonionic. The amount of surfactant used in this step of my process varies from as little as 0.05 up to 1 gallon per 500 gallons of oil-in-water emulsion being treated.

After the emulsion has been thus treated, the final step of my process consists of slowly agitating the oil-in-water emulsion for a period of time ranging between $\frac{1}{2}$-5 hours. At the end of this time, good resolution of the emulsion is obtained. An important feature of this invention is that the emulsions can be resolved at ambient temperatures.

To illustrate my invention, the following is presented by way of example:

Under actual field conditions a uranium solvent extraction emulsion was obtained. The organic portion of the emulsion contained approximately 94% kerosene, 3% fatty amine, and 3% of isodecanol which is a cosolvent for the amine. The nonorganic portion of the emulsion was a mixture of fine clays, aluminates, diatomaceous earth filter media and molybdates. To this emulsion was added 200 ppm of the Copolymer A emulsion. It was rapidly mixed for about 15 minutes to obtain good dispersion. After this mixing, ammonia was added to the oil-in-water emulsion to adjust the pH to 9.5. The ammonia was added with good agitation being applied to the system. This rapid mixing insured ammonia complexing of the molybdenum and was carried out over a period of about 15 minutes.

After the ammonia was added and mixed, 0.3 gallons of nonyl phenol reacted with 9 moles of ethylene oxide was added per 500 gallons of emulsion being treated. The emulsion was again agitated rapidly for about 3 minutes to uniformly mix the surfactant with the emulsion. After this treatment, the emulsion was subjected to a slow, gentle mixing for 2 hours at which time the emulsion had resolved to produce an organic layer which was 35% by volume of the emulsion, a 40% aqueous layer which contained all of the molybdenum present, and a 25% rag which contained the majority of the inorganics.

The organic layer was capable of being recycled back to the process.

The above treatment, when compared with the use of the copolymer emulsion alone without the other treating steps described herein comprises about a 20% improvement.

Having thus described my invention, it is claimed as follows:

1. A method of resolving oil-in-water emulsions resulting from the organic solvent extraction of uranium from aqueous acidic leach liquors which comprises treating said emulsions in accordance with the following steps:

(a) adding to said emulsions a water-in-oil emulsion which contains from 2-50% by weight of a water-soluble acrylamide copolymer which contains from 5-50% by weight of a lower alkyl substituted tertiary aminoethyl methacrylate and quaternary ammonium salts thereof in an amount to provide at least 20 parts per million of the acrylamide copolymer;

(b) adjusting the pH of the emulsion being treated with ammonia to at least 9;

(c) adding to the ammonia treated emulsion a water-soluble surfactant which is capable of inverting the water-in-oil emulsion which contains the polymer; and then (d) slowly mixing the treated oil-in-water emulsion for at least one-half hour to obtain good resolution thereof.

2. The method of claim 1 wherein the organic solvent comprises an organic hydrocarbon liquid which contains a fatty substituted amine and the lower alkyl substituted tertiary aminoethyl methacrylate is dimethylaminoethylmethacrylate which is used at a dosage ranging from 20-200 ppm.

* * * * *